United States Patent Office 3,667,896
Patented June 6, 1972

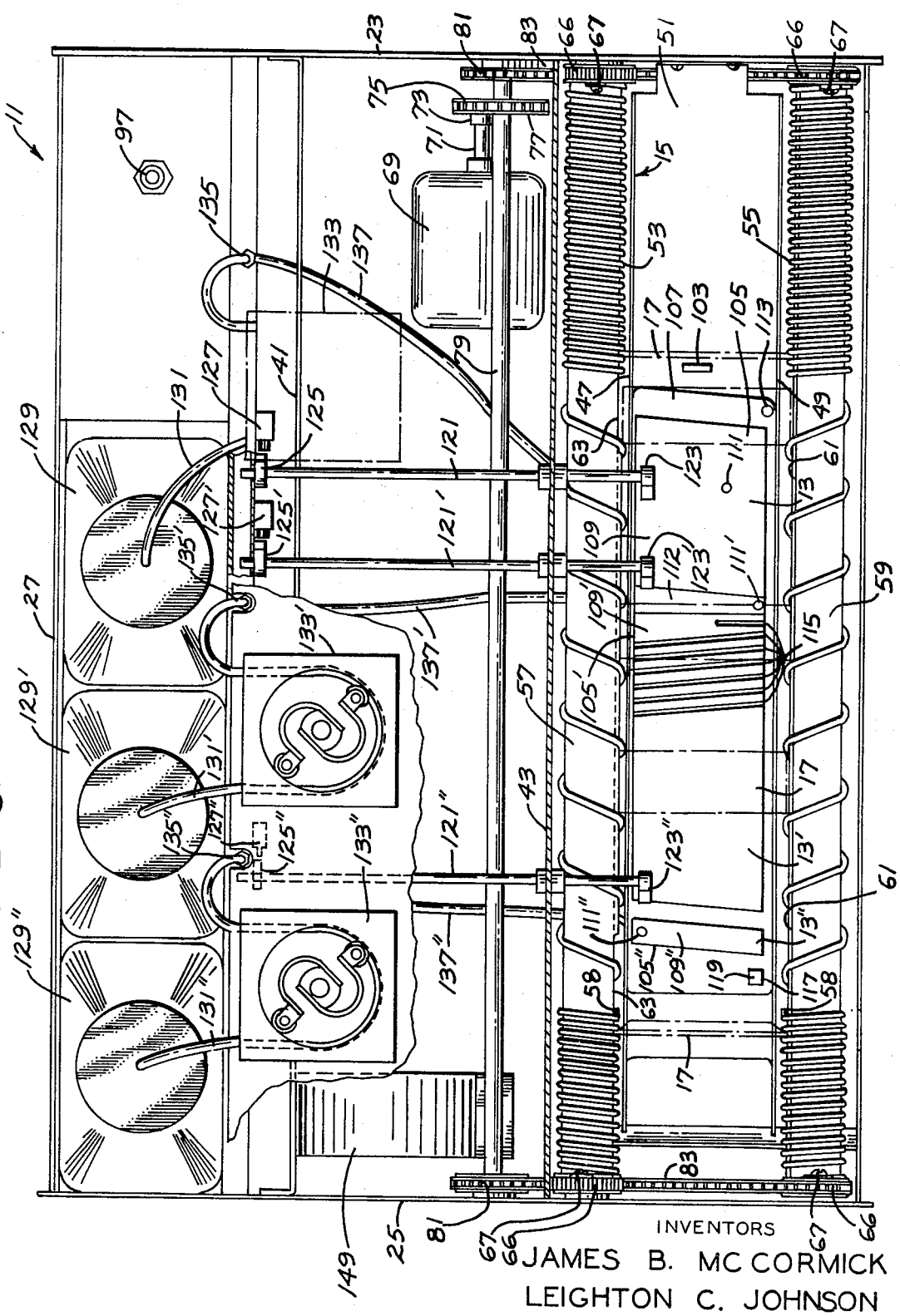

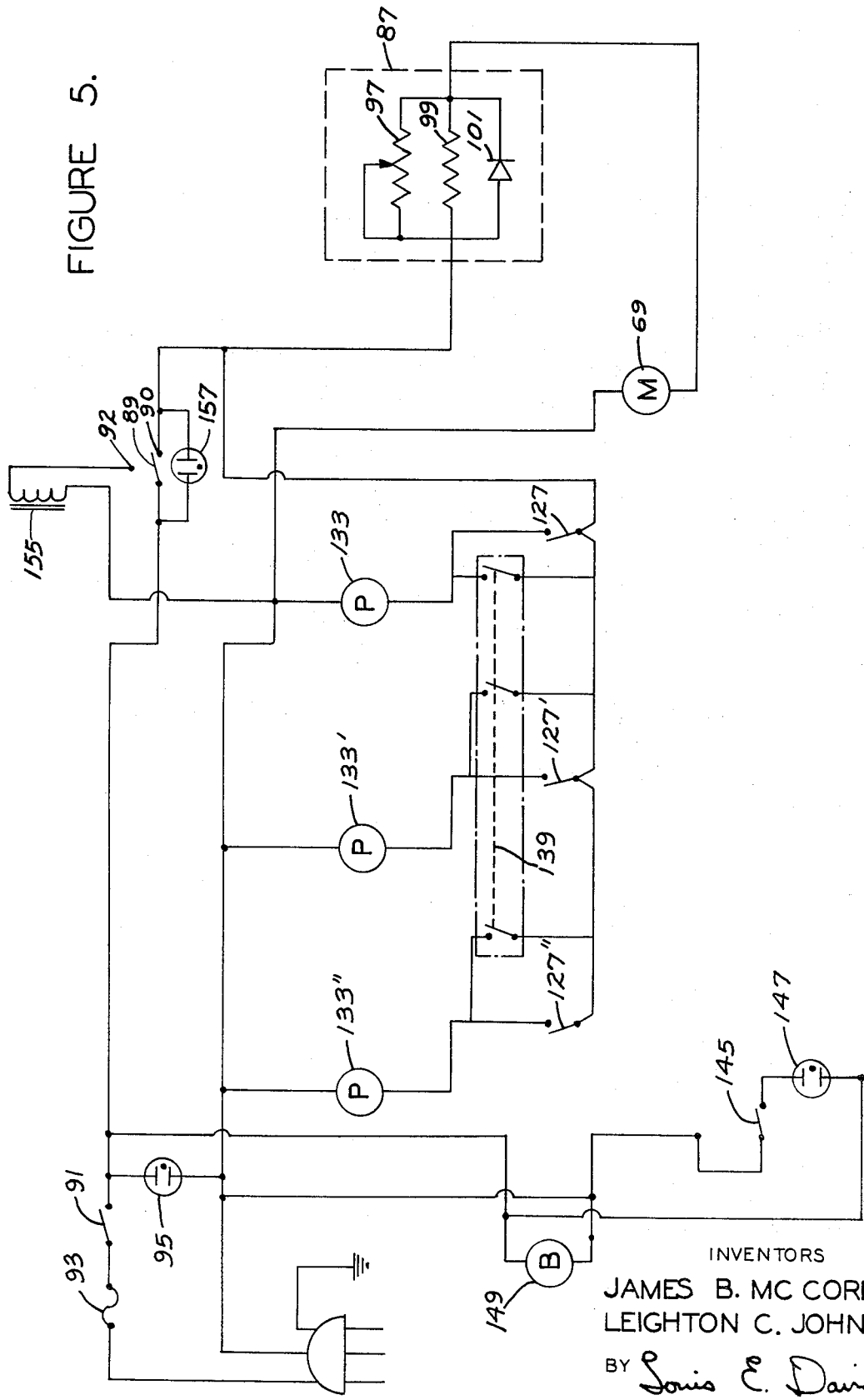

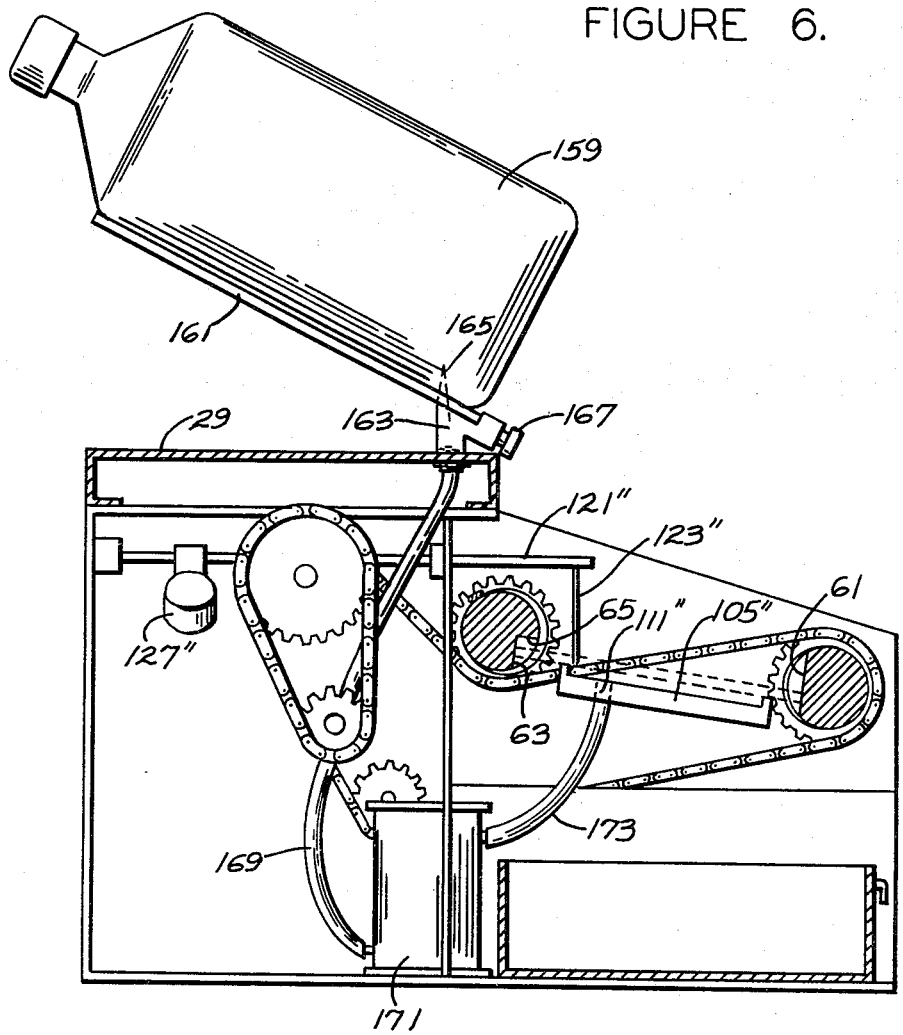

3,667,896
APPLYING FILM OF STAIN TO TISSUE MOUNTED ON A MOVING SLIDE
James Benjamin McCormick, La Grange, and Leighton Clifford Johnson, Westmont, Ill., assignors to Miles Laboratories, Inc., Elkhart, Ind.
Application June 7, 1965, Ser. No. 461,613, now Patent No. 3,431,886, which is a continuation-in-part of application Ser. No. 379,822, July 2, 1964. Divided and this application Oct. 21, 1968, Ser. No. 822,752
Int. Cl. D06p 3/00
U.S. Cl. 8—3
1 Claim

ABSTRACT OF THE DISCLOSURE

Apparatus and the method of operation thereof is described for conveying objects, such as microscope slides, over a flat liquid applying surface and injecting a treating liquid into the space between the object and the surface.

---

This is a division of application Ser. No. 461,613, filed June 7, 1965, which issued as U.S. Patent No. 3,431,886 on Mar. 11, 1969, and which was a continuation-in-part of our copending application Ser. No. 379,822, filed on July 2, 1964, now abandoned.

The present invention relates to method and apparatus for advancing an object through a station at which one face of the object is treated. More particularly, the invention relates to method and apparatus for applying a liquid to one face of a microscopic slide. Still more particularly, the invention relates to method and apparatus for automatically and successively staining material carried on a plurality of microscopic slides.

In the microscopic examination of certain material, particularly cellular materials such as blood, tissue, etc., it is customary to place a smear of a liquid or substrate containing the material (e.g., a smear of plasma containing blood cells), or a thin section of the material itself (e.g., a thin slice of animal tissue) on a transparent plate or slide. Thereafter, the material is stained by subjecting it to contact with solutions which stain or dye only certain constituents of the cell to thus provide a contrast which facilitates visual examination.

Various staining procedures are utilized to produce different desired effects. For example, a solution may be employed to color a transparent substrate and thus provide contrast to essentially colorless cells; other solutions may be utilized to effect color differences between various parts of a cell. Solutions may be used to stain only portions of a cell, e.g., the nuceli and not the cytoplasm and, in a procedure known as negative staining, the cells may be caused to appear colorless against a colored background. Certain of the procedures are relatively simple and require the use of only a few solutions. Others, however, are complex and require successive applications of a relatively large number of different solutions.

In many of these staining procedures, certain of the solutions merely prepare or fix the substrate whereas the actual stains are made by one or more natural or synthetic dyes. The dyes selected are, of course, suited for the type of cell and the staining desired. The oxazine dyes, the triphenylmethane dyes, and the thiazine dyes are examples of some families of dyes that are commonly used.

In a conventional staining procedure it has been the general practice to dip the slide sucessively into each of a series of containers holding an appropriate solution, the slide being allowed to remain in each solution for a predetermined time interval of perhaps several minutes before being removed and dipped into a succeeding solution. Usually, the last container holds a wash, such as water, after which the slide is dried for examination. Regardless of what solutions are used, however, each step in the staining operation is usually performed manually by a technician.

Depending upon the nature of the material being stained and the type of staining desired, as many as twelve solutions may be required and the overall procedure, when performed in the above-described manner, is thus quite time-consuming. The fact that many slides are frequently involved merely multiplies the problem. Furthermore, when successive slides are passed through the same container of solution, as is the case where dipping is employed, there is a danger of contamination of the solution. This danger increases when the same solution is used in different staining procedures for different types of materials and substrates.

It is an object of the present invention to provide an improved method for treating one face of a generally flat object, and to provide improved apparatus for carrying out such method. It is another object of the present invention to provide an improved method and apparatus for automatically and successively applying liquid stain to materials carried on a plurality of slides. Still another object of the invention is to provide an improved method and apparatus for automatically staining material carried on a slide by successively effecting contact between such material and each of a plurality of solutions. A further object of the invention is to provide an improved method and apparatus for automatically staining material carried on one face of a slide by successively applying solutions only to that face of the slide carrying the material. It is a still further object of the invention to provide an improved method and apparatus for automatically staining material carried on a plurality of slides by applying a metered quantity of previously unused solution for each application to each slide, and it is still a further object of this invention to provide an improved control system for controlling the operation of a slide staining apparatus. These and other objects of the invention are more particularly set forth in the following detailed description and in the accompanying drawings wherein:

FIG. 3 is an enlarged top view of the apparatus shown in FIG. 1, with the lid, the control panel and the front portion of the housing removed and with some parts broken away for clarity of illustration, some being slides shown in phantom;

FIG. 4 is a sectional side view taken along line 4—4 of FIG. 2.

FIG. 5 is a schematic diagram of the electrical control circuitry of the apparatus shown in FIG. 1;

FIG. 6 is a sectional side view taken on a plane similar to that of FIG. 4 of an alternate embodiment of the invention.

Figure 1:
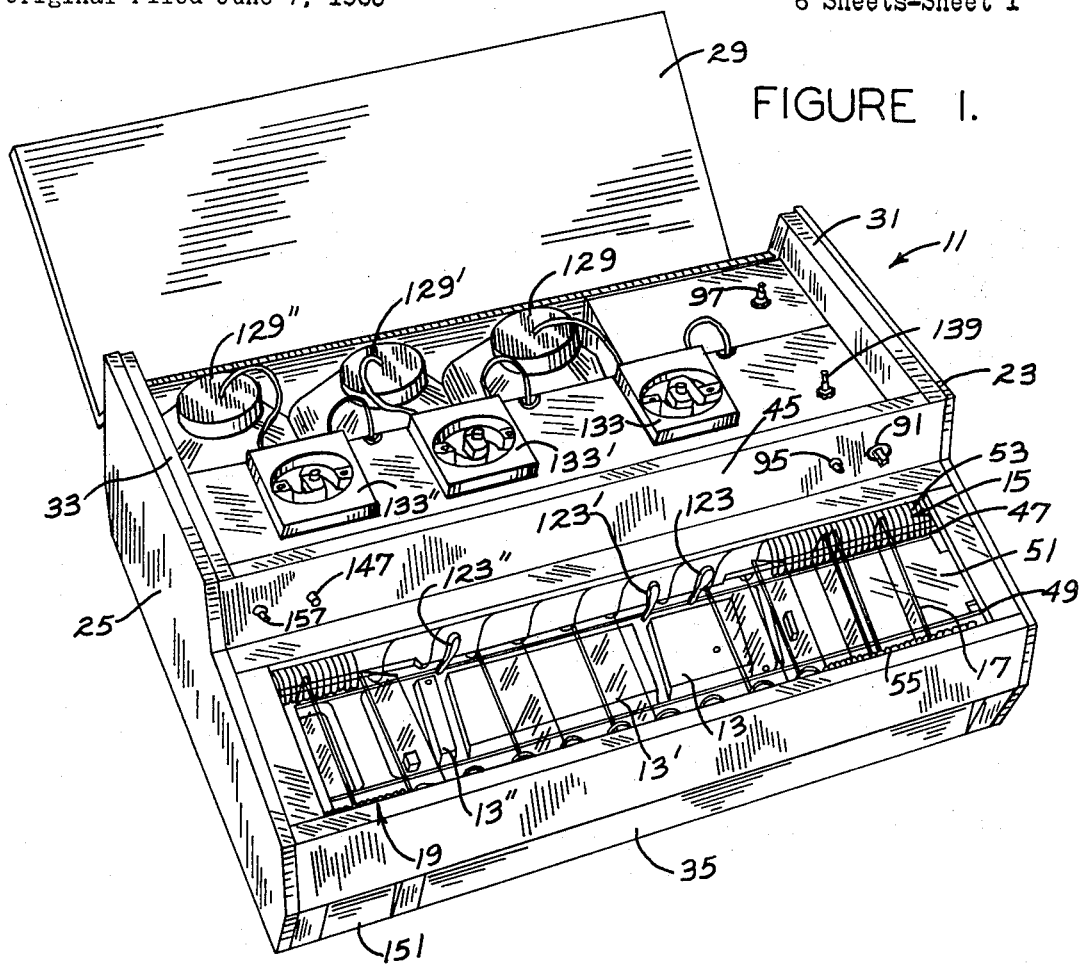
FIG. 1 is a perspective view of the apparatus showing various of the features of the present invention.

Very generally, the present invention provides a method and apparatus for automatically applying liquid to one face of a slide the application being of a single or of multiple solutions as selected. This method and apparatus are particularly useful for automatically staining material carried on one face of each of a plurality of slides. In the embodiment illustrated in FIGS. 1 to 4, a slide-staining apparatus 11 is provided which comprises a plurality of treating, i.e., liquid-applying, stations 13, 13' and 13" and a feed mechanism 15 for advancing generally flat objects, such as transparent glass slides 17, past said plurality of treating stations. A liquid-applying device located at each of the stations automatically subjects one face of each slide 17 to contact with a metered quantity of desired liquid.

To provide a compact apparatus capable of handling a fairly large number of slides, the feed mechanism 15 is designed to accept slides 17 aligned in generally parallel face-to-face relationship and each disposed so as to rest upon a longitudinal edge and thereby lie in generally vertical planes. As the slides 17 are advanced by the feed mechanism 15, they are rotated so as to be aligned in generally parallel edge-to-edge relationship and thereby lie in a generally horizontal plane as they pass through liquid-applying stations. After the slides 17 have passed the last of these stations, they are returned to their previous generally vertical orientation. A drying and collection station 19 is located adjacent the output end of the feed mechanism 15, which first dries the slides 17 and then automatically removes them from the feed mechanism 15.

Now referring more particularly to the drawings, the apparatus 11 includes a base 21, a pair of end plates 23 and 25, a back plate 27, a control panel 45, and a top cover or lid 29 which is hinged to the back plate 27 and when closed is supported by inwardly directed flanges 31 and 33 on the end plates 23 and 25 respectively. A side intermediate support plate 37 (FIG. 2) and rear intermediate support plates 39, 41 and 43 (FIG. 4) extend upwardly from the base 21 and, together with the base, the end plates 23 and 25, and the control panel 45, support the various operative components of the apparatus 11.

The feed mechanism 15 includes a track which extends longitudinally of the apparatus 11 and is defined by a pair of generally parallel rails 47 and 49 which are spaced apart horizontally a distance less than the length of a standard glass slide which, conventionally, is about three inches in length and one inch in width. Rails 47 and 49 may be formed from separate bars or rods, for example. Preferably rails 47 and 49 are formed from up-turned edges of a track member 51 which will be described in more detail later. In the operation of the apparatus, the slides 17 straddle or span the rails 47 and 49 with each rail engaging each slide at a point spaced inwardly from an end thereof (FIG. 3). If desired, the slides may be inclined slightly during their movement along the track so that any applied liquid may have a greater tendency to drain therefrom. One way to accomplish this is to have the upper surface of the rear rail 47 elevated slightly relative to the front rail 49. This difference in elevation of rails 47 and 49 is shown in an exaggerated manner in FIGS. 2, 4 and 6.

To advance the slides 17 along the rails 47 and 49 and to maintain a predetermined spacial relationship between said slides, the feed mechanism 15 includes a pair of conveyor elements 53 and 55 which flank the rails 47 and 49. The conveyor element 53 is positioned behind and extends generally parallel with the rear rail 47 and may be in the form of a heavy wire wound to provide, for example, a left-hand helix (using standard screw terminology). The conveyor element 53 is supported by a stationary rod 57 extending coaxially therethrough and suitably supported at its opposite ends by the end plates 23 and 25. The conveyor element 55 is positioned in front of and extends generally parallel with the front rail 49 and may be in the form of a heavy wire wound to provide, for example, a right-hand helix. The conveyor element 55 is supported by a stationary rod 59 extending coaxially therethrough. The conveyor elements 53 and 55 are preferably substantially identical except for the direction of their helical configurations. The pitches of the helices which form conveyor elements 53 and 55 vary along the length of conveyor elements 53 and 55. At the right hand end of the conveyor elements, as seen in FIGS. 1 and 3, the pitches of the conveyor elements are such that the turns of the helices are quite close together. The gap between adjacent turns of a given helix being only slightly greater than the thickness of the flat object to be treated, e.g., a glass slide. The pitches of the helices change in their intermediate portions so that the gap between adjacent turns is enlarged to a distance slightly greater than the width of the flat object to be treated. At the left hand end of the conveyor elements, the pitches of the helices again are such that the turns of the helices are quite close together. The changes in pitch of each of the helices 53 and 55 enable the slides to be rotated from a generally vertical position (normal to the plane of the track) to a generally horizontal position (parallel to the plane of the track) and then back to a generally vertical position as the slides move along rails 47 and 49. This rotation of the slides will be described in more detail later. Because the helices of the conveyor elements 53 and 55 are designed principally for use with glass slides, they are preferably made from a material which withstands wear against glass, such as chrome plated stainless steel wire. When the slides are to be inclined slightly, as described above, rod 59 may be at a slightly lower elevation than rod 57 to accommodate the inclined disposition of the slide 17 positioned on the inclined track member 51 wherein rail 47 is elevated slightly relative to rail 49.

The inner diameters of the helical conveyors 53 and 55 are somewhat greater than the diameters of the rods 57 and 59 which they surround so that the helical conveyors can be freely rotated thereabout said rods in a manner soon to be described. In addition, the spacing between the conveyors 53 and 55 is such that the minimum distance between conveyors 53 and 55 is less than the length of a standard slide. Thus, slides 17, engaged by or supported upon the rails 47 and 49, are positioned with their ends inserted between adjacent turns of the helicals 53 and 55 and are maintained in spaced relation to one another thereby. An inside segment (facing rod 57) of rod 59 is removed providing a flat chordal surface 61 which acts as a guide for the adjacent edge of slide 17. Inside and segments of rod 57 are similarly provided with flat chordal surfaces 63. The central portion of rod 57 is cut away to provide a flat surface connecting and substantially coplanar with flat surfaces 63 and a downwardly facing shoulder 65 which is positioned to overlap the rear ends of slides 17 as they are moved along the rails 47 and 49, as will become more apparent shortly. The spacing between rods 57 and 59 is such that the distance between flat chordal surfaces 61 and 63 is only slightly greater than the length of a standard slide. To improve clarity of illustration, the glass slides 17, which are shown in FIGS. 1 and 6, are omitted from FIG. 2 and are shown in phantom in FIGS. 3 and 4.

Rotation of the helicals 53 and 55 is accomplished by drive means including similar sprocket wheels 66 rotatably carried on each end of each rod 57 and 59. Each sprocket wheel 66 includes an inwardly facing shoulder to which the adjacent end of a respective helical is attached, as by a screw 67. The drive means further includes an electric motor 69 (FIGS. 2 and 3) having an output shaft 71 which has a small sprocket 73 affixed thereto which is connected via a short roller chain 75 to a larger sprocket 77, affixed to a drive shaft 79. The shaft 79 extends longitudinally completely across the apparatus 11 and is appropriately journalled in bearings carried by the end plates 23 and 25. Similar drive sprockets 81 are fixedly mounted on the shaft 79 near each end thereof, and similar roller chains 83 connect the sprockets 81 and the adjacent two sprocket wheels 66 at the respective ends of the apparatus. The roller chains 83 are further engaged with idler sprockets 85 which are rotatably mounted on the inner surfaces of end plates 23 and 25.

Figure 2:
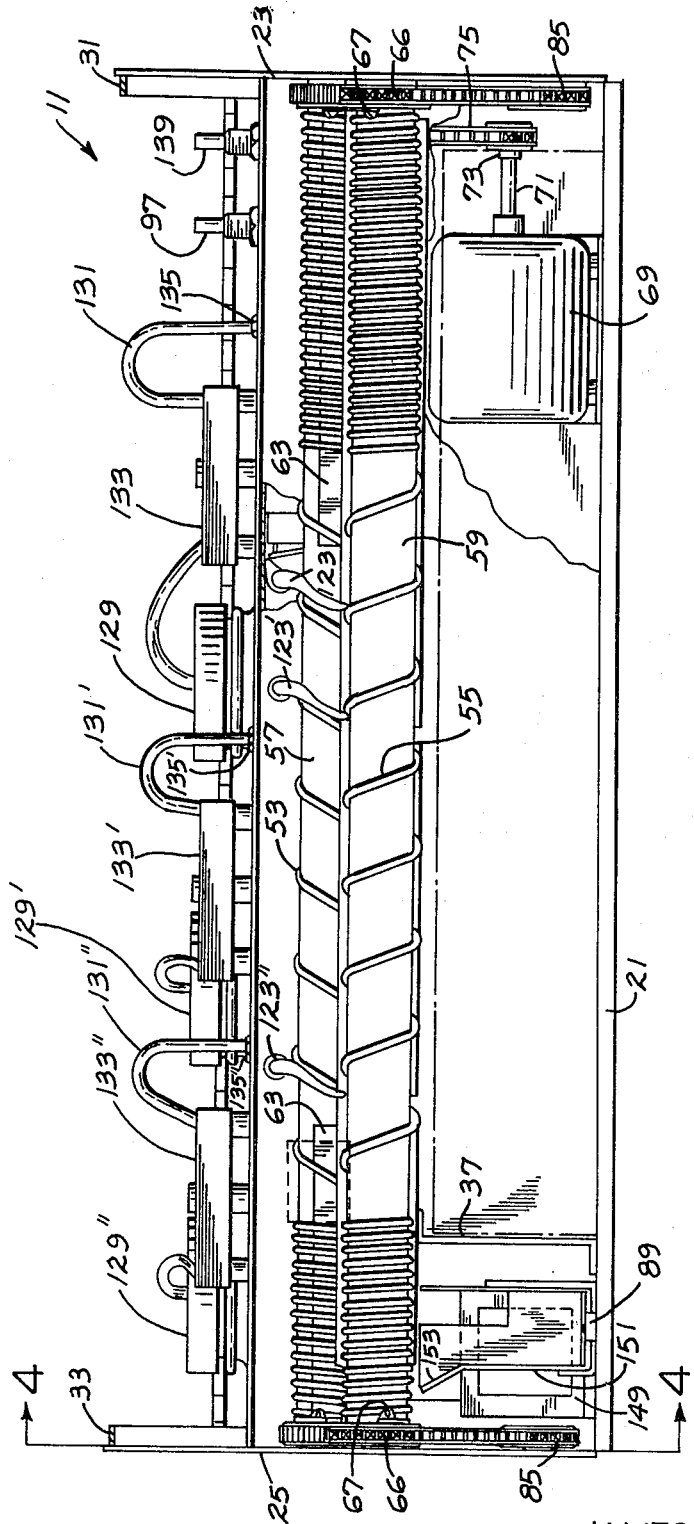
FIG. 2 is an enlarged front view of the apparatus shown in FIG. 1 with the lid, the control panel and the front portion of the housing removed, and with some parts broken away for clarity of illustration.

It will be noted that by virtue of the manner of connection of the chains 83 to the sprocket wheels 66, the helicals 53 and 55 are rotated in opposite directions, the rear helical 53 being rotated in a counterclockwise direction as viewed in FIG. 4, whereas the front helical 55 is rotated in a clockwise direction. Accordingly, since helical 53 is left-handed and helical 55 is right-handed rotation thereof as described above causes slides 17 supported between the turns thereof to be advanced from right to left across the apparatus (FIGS. 1, 2 and 3). Of course, if two right-handed helices or two left-handed helices were used, the chain drive would be modified so that they would both be driven in the same direction. However, the illustrated arrangement is preferred because it reduces or eliminates friction which might tend to undesirably tilt the slides 17 on the rails 47 and 49 if two helical wound in the same manner were used.

As best seen in FIGS. 1 and 3, slides 17 which are vertically seated in the input end of the feed mechanism 15, at the right-hand side of the appartaus 11, are advanced to the left past the various liquid-applying stations 13, 13' and 13'' incident to rotation of the helicals 53 and 55. At the input end, the turns of he helicals 53 and 55 are quite close together, the gap between adjacent turns being only slightly greater than the thickness of the at object to be treated, e.g., a glass slide. However, the pitches of the helicals change in their intermediate portions so that the gap between adjacent turns is enlarged to a distance slightly greater than the width of the flat object to be treated. This construction enables the flat objects handled, as they are advanced from right to left, to be rotated from the vertical face-to-face relationship to a generally horizontal edge-to-edge relationship in which the lower faces thereof rest on the rails 47 and 49 as distinguished from the prior relationship wherein only the lower longitudinal edges of the flat objects touched the rails. When microscopic slides are handled in the illustrated apparatus the material to be stained is carried by the lower face of the slides when the latter travel in the horizontal position past the liquid-applying stations.

More specifically, as the slides 17 in generally vertical face-to-face disposition are advanced into the sections of the helicals 53 and 55 wherein the change in pitch occurs to increase the gap between adjacent turns, their upper edges are slowly tilted forwardly in the direction of advancement, i.e., the upper edge of the slide becomes the slide leading edge and the bottom edge of the slide becomes the slide trailing edge. In order to assure that this initial transition from the generally vertical position to the generally horizontal position takes place as planned, a barrier arm 103 (see FIG. 3), preferably constructed of a resilient material such as rubber, is attached to track member 51 in a location where it successively engages each of the slides 17 near the lower edge thereof at the position along the feed mechanism 15 where the pitch of the helicals 53 and 55 begins to change. The frictional engagement of the lower edge of a slide 17 by barrier arm 103 tends to hold the lower edge of the engaged slide in place while the upper edge of said slide is free to move forward and downward as the helicals 53 and 55 advance the slide along rails 47 and 49 and as the spacing between turns of helicals 53 and 55 increases. Other barrier means can also be used in any convenient manner to aid in turning the slides from a generally vertical position to a generally horizontal position.

After passing the various liquid-applying stations, 13, 13' and 13'', the advancing slides 17 are returned to the generally vertical face-to-face relation as they approach the left-hand end of the apparatus 11, and move into the left-hand end portion of the helicals 53 and 55 which are closely wound. At the point of this second pitch transition, it can be seen that the helicals 53 and 55 lift the leading edge of successive generally horizontal slides 17 upwardly and rearwardly into a substantially vertical orientation. This rotation of the slides is aided by lugs 58 (see FIG. 3) attached to helicals 53 and 55 near the point of second pitch transition. These lugs pass up under the leading edge of the adjacent slide and start the lifting motion. The change in pitch of the helicals 53 and 55 completes the slide rotating action. Thus, the slides 17 are in vertically disposed face-to-face relation when they enter the drying and collection station 19.

As described above, the feed mechanism 15 maintains the flat objects to be treated, such as glass slides, in close-spaced generally vertical face-to-face relation both before and after they pass through the treating stations. These vertical dispositions have several advantages. First, in such vertical positions, the slides occupy a relatively small amount of track space and a track of much lesser length is capable of serving a given number of slides as compared with track length required when all the slides are continuously maintained in a generally horizontal edge-to-edge disposition. Viewed in another way, a track having a given length can accommodate a substantially larger number of slides in vertical face-to-face relation than it can in edge-to-edge relation. A large number of vertically disposed slides can be placed in the input end of the apparatus, thus permitting continuous operation of the apparatus, without the constant attentions of a technician. The vertical disposition of the slides at the output or drying and collection end of the apparatus has additional advantages. As described below, the slides are dried by blowing air over them. The vertical position of the slides facilitates drainage and aids in obtaining desirable drying air flow over the slides. Also, the slides in closely-spaced vertical disposition take a relatively long period of time to pass through the output end of the apparatus and are thus satisfactorily dried.

Referring to FIG. 5 which illustrates an electrical circuit for the apparatus, the motor 69 of the drive means for rotating helicals 53 and 55 is connected in series with a speed control means 87, a basket switch 89, an on-off switch 91 and a fuse 93 to a conventional source of electrical power (not shown). An indicator light 95 which is illuminated by closure of switch 91 is connected in parallel with the power source. The speed control means 87 includes, for example, a variable resistor 97 in parallel with a fixed resistor 99 and a diode 101. A means of varying the speed of the motor 69 is desirable in order to increase the versatility of the apparatus 11 by permitting variation in the speed at which the helicals 53 and 55 are rotated and thereby a variation in the speed at which the slides 17 are advanced along the rails 47 and 49. For many applications, however, a constant speed motor operating at approximately one revolution per minute is satisfactory.

FIG. 5 also shows a basket indicator light 157, buzzer 155, liquid level switch 145, liquid level indicator light 147, pumps 133, 133' and 133'', pump switches 127, 127' and 127'', triple pole pump priming switch 139 and blower 149. These circuit elements will be described in more detail later.

Referring now to the treatment of a generally flat object, as illustrated by application of liquids to a slide for staining a substance positioned thereon, the illustrated apparatus 11 includes three separate liquid-applying stations 13, 13' and 13''. It is to be understood, of course, that any number of such stations may be provided and that the number shown is only illustrative of a particular staining procedure, namely, the Wright procedure for staining blood smears. In carrying out the Wright procedure in the improved apparatus, the staining liquid is applied at the first station, a buffer liquid is applied at the second station and a washing liquid is applied at the third station.

Figure 7:
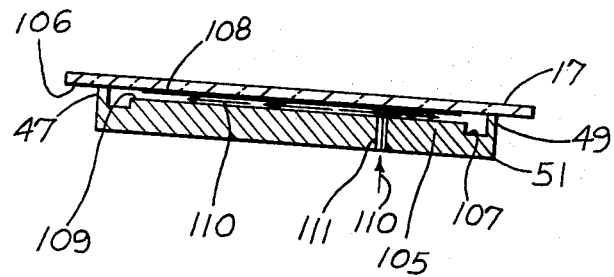
FIG. 7 is a cross-sectional view of a slide positioned over a portion of the apparatus of FIG. 1.

Each of the liquid-applying stations, exemplified by station 13, includes a stationary platen 105 (FIG. 3) securely mounted within a recessed portion 107 of track member 51 and between the rails 47 and 49. The platen 105 is positioned so that its upwardly facing surface 109 is parallel with and closely subjacent to the plane of the upper surfaces of the rails 47 and 49 so as to be parallel with and in close proximity to the lower face 106 of a slide 17 supported by rails 47 and 49 and positioned over said platen as shown in FIG. 7. The platen 105 is provided with an orifice 111 through which a predetermined quantity of liquid 110 can be injected into the space between the upper surface 109 of platen 105 and an overlying slide 17 to thereby contact with said liquid 110 the lower surface 106 of the slide 17 and the material 108 carried thereby. Since the lower face 106 of slide 17 is in close proximity to platen surface 109, e.g., a spacing of a few thousandths of an inch, the surface tension of the injected liquid 110 is sufficient to completely fill the laminar volume between these two flat surface 106 and 109. As the slide advances along the rails 47 and 49 and across the platen 105, the entire lower surface area of the slide which passes in face-to-face relation with surface 109 of platen 105 is thus brought into contact with the liquid and the material carried thereby is similarly contacted by the liquid. The surface tension of the liquid causes said liquid to be retained in the space between the platen 105 and slide 17 until the slide has passed completely beyond the platen and as the slide leaves the left hand edge of the platen 105, the liquid is wiped from the slide due to the tendency of the liquid to adhere to the platen rather than to the slide. Thus, the slide 17 is only moist as it proceeds toward the next station 13' and has no droplets of liquid adhering to it. The liquid wiped from the slide flows into the recessed portion 107 of track 51, then into a drain 113 which communicates with a drip tray 35 removably positioned thereunder.

As shown in FIG. 3, the left-hand edge of platen 105 is positioned at an acute angle with respect to the front edge of the platen such that the leading edge of the slide 17 is wiped in a downward direction as the slide passes beyond the platen 105. This aids in wiping and also in efficient collection of the wiped liquid at the lower region of the recessed portion 107 of track member 51.

As shown in FIG. 3 the platens 105 and 105' are preferably formed from a unitary member having a recess 112 extending from front to rear between said platens. A liquid injecting orifice 111' is provided in the recess 112 so that after a slide leaves the platen 105 of first liquid-applying station 13, it then passes over orifice 111' and the second liquid-applying station 13'. When the lower face of slide 17 is positioned over at least a portion of the upper surface 109' of platen 105', a predetermined quantity of liquid is injected from orifice 111' against the lower face of the slide. This injected liquid then flows into the laminar space between the lower face of the slide and the upper surface 109' of platen 105'. The recessed portion 112 acts as a liquid reservoir to provide liquid for this laminar space.

As the slide 17 is slowly advanced across platen 105', there is a circulatory motion set up in the liquid film between the lower face of the slide and the upper surface 109' of said platen. This circulatory motion tends to cause desired mixing of the liquid film with the liquid retained on the slide from the previous station. In the preferred form of the invention, grooves 115 are placed in the upper surface 109' of platen 105' to promote this circulatory motion and mixing action. The grooves 115 act as capillary channels which conduct the liquid across the face 109' of the platen 105'. The grooves 115 are preferably positioned at a generally obtuse angle with respect to the front edge of the platen such that the capillary action draws the liquid upward along the slide as it passes over the platen and grooves. The grooves 115 may, however, be positioned at an acute angle with respect to the front edge of the platen such that the capillary action draws the liquid downward along the slide as it passes over the platen and grooves. The number, size and specific location of the grooves will vary depending upon the particular staining or liquid-applying procedures being employed. It is within the knowledge of those skilled in the art to determine these apparatus variations.

As a slide 17 leaves the left-hand edge of platen 105' the excess applied liquid is then wiped off the slide in the same manner as at platen 105. The slide then passes over platen 105" of the third liquid-applying station 13" where liquid is injected through orifice 111" formed in the upper surface 109" thereof, and the lower face of the slide is exposed to the injected liquid in the same manner as at stations 13 and 13' described above. The slide is also wiped by the left-hand edge of platen 105" in a manner described above. To insure substantially complete removal of excess liquid from the lower face of the slide, it is passed over a platen 117 having an upper surface 119 of reduced area disposed in substantially the same plane as the platen upper surfaces 109, 109', and 109" and aligned with the front edges thereof. Surface 119 is located so as to wipe off any droplets which may have collected on the lower surface of a slide passing thereover.

The orifices 111, 111' and 111" described above can be located in any convenient place on or adjacent to respective platens 105, 105' and 105". The orifice locations shown in FIG. 3 are employed when the track member 51 is tilted slightly so that rail 49 is slightly lower than rail 47. The upper surfaces 109, 109' and 109" of the platens 105, 105' and 105" are inclined downwardly toward the front of the apparatus. When liquid is introduced into the space between the lower face of the slide and the upper surfaces of the platens from orifices 111 and 111' at stations 13 and 13', it is desirable to have such liquid be introduced at the lower portion of such space and thus push any intereferring air in such space out through the top of the space. In the washing step of the third stage 13", it is desirable to have quick and complete contact of the lower face of the slide with the washing liquid. Orifice 111" is thus located at the top of platen 105" to enable a film of liquid to flow down under the influence of gravity over surface 109" prior to the passage of the slide over surface 109".

As will be noted in FIG. 3, each platen is of a width, measured in a direction from rail 47 toward rail 49, slightly less than the length of a slide measured in the same direction so that the film of liquid is in contact with a major portion of the lower face of the slide as the slide is moved across the platen. The length of the platen, measured in a direction from right to left along track member 51, determines the length of time during which the liquid remains in contact with the material on the slide and hence, varies with the treatment to be accomplished. In the illustrated embodiment, the first platen 105 encountered by the slide has a length about 1½ times the width of a standard slide, the second platen 105' has a length over five times the width of a standard slide, while the length of the last platen 105" is less than the width of a standard slide.

Track member 51 is preferably formed as a single element containing rails 47 and 49, platens 105, 105' and 105", recessed portion 107, orifices 111, 111', and 111", recess 112, drain 113, grooves 115 and platen 117. Such single element can conveniently be formed by metal molding.

To provide timely injection of liquid at each liquid-applying station, a liquid pumping and switching mechanism is provided in association with each of the liquid-applying stations. The switching mechanism for station 13 includes a horizontally disposed shaft 121 extending from front to rear and suitably journalled at its rear end near the intermediate support plate 39. The shaft 121 extends through a bearing in the intermediate support plate 43 and overhangs slightly the track 51, terminating at a point between the rails 47 and 49. A depending finger 123 is rigidly affixed to the front end of the shaft 121 and is of sufficient length so that it is adapted to be engaged by the leading edge of the slides 17 moved along the track.

When the finger 123 is pivoted through contact with moving slide 17, the shaft 121 is rotated, causing a cam 125 affixed to the rear end of the shaft to rotate and actuate a normally open lever switch 127. This activates a liquid applying means causing liquid to flow through orifice 111. The weight of the finger 123 together with the force of the spring return on switch 127 is such to cause the switch 127 to open and the shaft 121 to rotate to its initial position after the finger 123 is no longer engaged by the slide 17. Similar switching mechanisms are triggered by fingers 123' and 123" for stations 13' and 13" respectively.

As shown in FIG. 5, the motors for pumps 133, 133' and 133" are connected to a power source (not shown) through pump switches 127, 127' and 127", respectively, as well as basket switch 89, on-off switch 91 and fuse 93. The pump motor for pump 133, for example, is energized by closing switch 127. Triple-pole switch 139 by-passes switches 127, 127' and 127" and can be used to simultaneously energize pumps 133, 133' and 133" as described below.

The liquid to be injected against the lower face of a slide at station 13 is stored in a container or bottle 129 located to the rear of apparatus 11. A flexible, for example plastic, tube 131 having one end inserted into the container and down into the stored liquid passes through a peristaltic pump 133 to a fitting 135. A second tube 137 conducts the liquid from the fitting 135 to the orifice 111 in the platen 105. The liquid thus flows through the orifice 111 only when the peristaltic pump 133 is operating. The pump 133 is electrically powered and is controlled by switch 127 in response to movement of the slide engaging finger 123. Similar pumps 133' and 133" for stations 13' and 13" are similarly connected to liquid containers 129' and 129" and are operated in a similar manner.

In order to have positive liquid flow through orifices 111, 111' and 111" at predetermined times controlled by engagement of slides 17 with fingers 123, 123' and 123", the fluid lines 137, 137' and 137" communicating with orifices 111, 111' and 111" should be full of liquid. One convenient way to accomplish this is to operate pumps 133, 133' and 133" to fill these lines prior to passing the slides 17 over platen 105. This specific "pump priming" action can be conveniently accomplished by pushing triple-pole priming switch 139 (FIGS. 1, 2 and 5) which by-passes pump switches 127, 127' and 127" and thus energizes pumps 133, 133' and 133" until liquid begins to flow out or orifices 111, 111', and 111".

Proper operation of this apparatus in applying liquid to slides, for example, can only be accomplished if sufficient liquid is applied at each liquid-applying station. It may be convenient to have indicating means to show when the quantity of liquid in the bottles 129, 129' and 129" is below a desired amount. One means for achieving this result is shown in FIG. 4, and it is understood that this means is illustrative only and that other means may be employed if desired. As shown in FIG. 4, the container 129" is supported upon a spring platform 141 secured to intermedate wall 39. An arm 143 is secured to the spring loaded platform 141 and projects through an opening in wall 39 to a position below microswitch 145 also mounted on wall 39. The spring action of the platform is such that when the bottle contains more than a predetermined minimum amount of liquid, its weight is sufficient to depress the platform 141 and arm 143 to a position out of actuating engagement with the normally open microswitch 145. As liquid is pumped from the bottle, the spring platform will rise and, upon discharge of substantially all the liquid, the platform, together with the arm 143, will rise, causing arm 143 to activate the microswitch 145 and illuminate indicator light 147. The circuitry is shown in FIG. 5. Thus a warning system is provided which will give an indication to the technician when the quantity of the liquid is low, thereby preventing improper staining and possible damage to the specimens carried on the sides. The illustrative apparatus has only a single indicator light governed by the liquid level in a single bottle. It is understood that the inventive apparatus can have an indicator means of this type for each liquid container, or the single light can be governed by the quantity of liquid in a bottle different from that shown in the figures. Other means can also be used which are responsive to the amount of liquid in the liquid supply means.

As previously described, each glass slide 17 is returned to a generally vertical position after passing the last liquid-applying station 13" so that it is vertically disposed when it reaches the drying and collection station 19. To assure that the slide and the material carried thereon are completely dry before the slide has an opportunity to come in contact with another slide, a small blower fan 149 (FIGS. 2, 3 and 4) is disposed in the rear, left-hand corner of the apparatus 11 and directs a gentle current of air outwardly past the slowly advancing slides. Because the pitch of the helicals 53 and 55 is only slight at this final station, it takes the slides 17 a relatively long period of time to pass through drying and collection station 19. Thus, each slide is exposed to the air currents supplied by the fan 149 for a sufficient length of time to assure that it is entirely dry.

As the glass slides 17 advance through the drying and collecting station 19 and reach the end of the track formed by rails 47 and 49, they drop from between the helicals 53 and 55 into a collection container or basket 151 which rests on a microswitch 89 positioned between collection container 151 and the base 21 of the apparatus 11. A slanted upper lip 153 is provided at the top of the left-hand wall of the container 151, as seen in FIG. 2, to direct the falling slides 17 into the container 151. The short drop into the container 151 does not cause sufficient shock to break the slide and is not harmful to the stained material carried thereon.

A basket signal means is provided to signal the technician when the basket 151 requires emptying. This means comprises the microswitch 89 which is activated when the weight of the container 151 and a desired number of slides therein is reached. The movable contact of the switch 89 normally is in electrical connection with contact 90 (FIG. 5) completing the connection between the motor 69 and a conventional power source. As the slides drop into the basket the total weight of the basket and slides increases. When the total weight of the basket and slides reaches a predetermined value representative of a desired number of slides, the movable contact of the microswitch 89 moves out of engagement with contact 90 and into engagement with contact 92. In this position the motor 69 and any operative peristaltic pumps 133, 133' and 133" are stopped and a buzzer 155 is activated, signalling the technician that the basket is ready for removal and emptying. Further, an indicator light 157 is thereby illuminated. This protective device eliminates the possibility that the basket will overfill, causing the slides to jam in the helicals and consequently break. With this possibility eliminated, the technician's mind is free from concern and can be devoted to more essential tasks.

The above description was directed to one form of the invention wherein the liquid to be applied to an object is mechanically pumped through an orifice. An alternative embodiment, shown in FIG. 6, employs gravity feed of the liquid from the storage containers positioned in an elevated location with respect to the application orifice. In this embodiment, the illustrated liquid container 159 is supported atop the apparatus cover 29 in a suitable cradle 161 mounted on a valve 163. The valve 163 includes a hollow needle 165 which extends through the cradle 161 and is adapted to puncture container 159, which is conveniently formed from soft plastic material. Thus, when the bottle 159 is pressed down on the valve 163, it is securely impaled upon the hollow needle 165. The rate of flow through valve 163 can be regulated by means of a threaded valve stem 167 which screws into the front of the valve. From the valve 163, the liquid passes through a conduit 169 into a metering valve 171 which conveniently may be solenoid-operated. From the metering valve 171, a second piece of tubing 173 conducts the liquid to the orifice 111" in platen 105". Accordingly, the liquid flows through orifice 111" when the valve 171 is open, and the flow ceases when valve 171 is closed. The operation of opening and closing valve 171 may be carried out in a manner described above for operating pump 133" wherein depending finger 123" engages a slide causing shaft 121" to rotate and actuate switch 127". Instead of controlling a motor the switch would control the valve 171 in the embodiment of FIG. 6.

The above-described apparatus and the method practiced thereby makes possible the conveying of generally flat objects in a novel manner from an input station successively past one or more treating stations in a predetermined orientation and thence to a collecting station. In the illustrated form of the invention a large number of slides can be automatically and successively treated with staining liquids. Thus, the tedious and repetitive job which lab technicians were formerly required to perform to stain slides for microscopic examinations is eliminated. The invention provides improved economy in staining because only a small measure, usually about 1 cc., of liquid needs to be expended for each slide at each station. Furthermore, superior quality and reproducibility of results is provided because the human factor is removed, insuring uniform performance of each step, and because each slide is always contacted with fresh liquid.

Various changes and modifications may be made in the illustrated embodiments without departing from the spirit of the invention, and all of such changes are contemplated as may come within the scope of the appended claims.

What is claimed is:

1. A method of staining material disposed on the underface of a slide for subsequent use in histology, which method comprises moving the slide across a generally horizontal flat surface with said underface of the slide disposed generally parallel to and spaced slightly from the surface, moving the side over an orifice through which a liquid staining solution is injected, filling with said liquid staining solution the space intermediate said horizontal flat surface and said underface of the slide, moving said liquid staining solution along said flat surface concurrently with said slide, and imparting a circulatory motion to said liquid under said slide so as to contact and stain the material on the underface.

References Cited
UNITED STATES PATENTS

| | | | |
|---|---|---|---|
| 2,393,580 | 1/1946 | Weiskopf | 8—94.11 |
| 2,984,540 | 5/1961 | Tillet et al. | 8—62 X |

OTHER REFERENCES

Lillie: "Histopathologic Technic," pp. 19–20. Pub. 1948 by the Blakeston Co., Phila. Pa. RB37L65 & Gp125.

Wadsworth: Standard Methods of the Division of Laboratories on Research of the New York State Department of Health, pp. 539–546, Pub. by Williams and Wilken, 1947, Belt. Md. RA 428W3 & Gp125.

American Dyestuff Reporter, Aug. 17, 1953, pp. 544–546, 8/MM. & TP890A512.

DONALD LEVY, Primary Examiner

U.S. Cl. X.R.

8—94.11; 117—3